US011055822B2

(12) United States Patent
Ramanujam et al.

(10) Patent No.: US 11,055,822 B2
(45) Date of Patent: Jul. 6, 2021

(54) ARTIFICIALLY INTELLIGENT, MACHINE LEARNING-BASED, IMAGE ENHANCEMENT, PROCESSING, IMPROVEMENT AND FEEDBACK ALGORITHMS

(71) Applicant: International Business Machines Corporation, Armonk, NY (US)

(72) Inventors: Karthick Ramanujam, Chennai (IN); Jayanth Gangadhar, Bangalore (IN); Ullas M. Basavaraj, Bangalore (IN); Ankur Bharatkumar Shah, Nanavat (IN)

(73) Assignee: International Business Machines Corporation, Armonk, NY (US)

( * ) Notice: Subject to any disclaimer, the term of this patent is extended or adjusted under 35 U.S.C. 154(b) by 160 days.

(21) Appl. No.: 16/402,409

(22) Filed: May 3, 2019

(65) Prior Publication Data
US 2020/0349674 A1  Nov. 5, 2020

(51) Int. Cl.
| G06T 5/00 | (2006.01) |
| G06K 9/62 | (2006.01) |
| G06F 16/53 | (2019.01) |
| G06F 16/54 | (2019.01) |
| G06N 20/00 | (2019.01) |
| G06N 5/02 | (2006.01) |
| G06F 16/51 | (2019.01) |

(52) U.S. Cl.
CPC .............. *G06T 5/001* (2013.01); *G06F 16/51* (2019.01); *G06F 16/53* (2019.01); *G06F 16/54* (2019.01); *G06K 9/6263* (2013.01); *G06N 5/02* (2013.01); *G06N 20/00* (2019.01); *G06T 2207/20081* (2013.01)

(58) Field of Classification Search
None
See application file for complete search history.

(56) References Cited

U.S. PATENT DOCUMENTS

| 6,507,670 B1 * | 1/2003 | Moed ....................... G06K 9/38 358/464 |
| 7,751,641 B2 | 7/2010 | Petrosyan |
| 8,035,855 B2 | 10/2011 | Monga |

(Continued)

*Primary Examiner* — Tahmina N Ansari
(74) *Attorney, Agent, or Firm* — Christopher M. Pignato

(57) ABSTRACT

Systems, methods, and computer program products leverage artificial intelligence, and machine learning to process image enhancements using image enhancement techniques and algorithms. Image enhancements are determined to be best suited for enhancing each image as a function of each images' calculated validation parameters by an analytics engine. The images are each categorized by the image quality as a function of the validation parameters. Images identified as having an improvement space are further processed by querying the images' validation parameters using a knowledge base comprising historical data describing past image enhancements and historical validation parameters to the current image. A matrix of recommended enhancements, along with a predicted success rate for improving the image quality is provided to a user interface. A user can select one or more enhancements to apply to the image(s) and further provide feedback to the knowledge base, further improving enhancement recommendations and success rates.

20 Claims, 6 Drawing Sheets

(56) References Cited

U.S. PATENT DOCUMENTS

| | | |
|---|---|---|
| 8,526,728 B2 | 9/2013 | Kang |
| 9,275,307 B2 | 3/2016 | Chattopadhyay |
| 9,852,499 B2 | 12/2017 | Ming |
| 10,531,795 B1 * | 1/2020 | Abou Shousha ........ A61B 3/14 |
| 2011/0255782 A1 | 10/2011 | Welling |
| 2018/0157899 A1 * | 6/2018 | Xu ....................... G06K 9/4628 |
| 2019/0222817 A1 * | 7/2019 | Abou Shousha .... G06K 9/0061 |
| 2019/0223716 A1 * | 7/2019 | Abou Shousha .... A61B 3/0091 |
| 2020/0338599 A1 * | 10/2020 | Shniberg ................... B07C 5/34 |
| 2020/0349674 A1 * | 11/2020 | Ramanujam ........... G06N 20/00 |

\* cited by examiner

ARTIFICIALLY INTELLIGENT, MACHINE LEARNING-BASED, IMAGE ENHANCEMENT, PROCESSING, IMPROVEMENT AND FEEDBACK ALGORITHMS

TECHNICAL FIELD

The present disclosure relates generally to the field of digital image processing and more specifically to image enhancement.

BACKGROUND

In computer science, the field of image processing is a form of signal processing which uses an image (such as a photograph or video frame as input) to generate outputs of the image processing which can be an image, a set of characteristics, or parameters related to the image. A "real world" image defined in the physical world is considered to be a function of two variables, for example f(x,y) with f as the amplitude (i.e. brightness or intensity) of the image at the real coordinate position (x,y). When the x,y and amplitude values of the function are finite, the image is a digital image. Digital images are composed of a finite number of elements, and each element has a particular value at a given location. These elements are referred to as "picture elements", "image elements" and/or "pixels". A digital image, f[m, n], is a discrete 2D space derived from the analog image f(x,y) occurring in a 2D continuous space through the use of a sampling process, commonly referred to as digitization. The continuous 2D image f(x,y) is divided into N rows and M columns. Intersections of a row and column is referred to as the pixel. The array of all of the pixels into which the digital image is divided is called the image matrix.

There are numerous types of images. Image types may include binary images, black and white images, 8-bit color image format images and 16-bit color image format images. Binary images contain two pixel elements, a 0 and 1 which refer to black (0) and white (1). A black and white image only consists of black and white color, whereas an 8-bit color format image has 256 different shades of colors, with 0 referring to black, 255 refers to white and 127 refers to gray. The 16-bit color format expands upon the 8-bit format and include 65,536 different colors.

SUMMARY

A first embodiment of the present disclosure provides a computer-implemented method comprising the steps of: receiving an image set comprising at least one image; calculating validation parameters for each image of the image set; categorizing each image of the image set based on the validation parameters, wherein the step of categorizing identifies a category of images in the image set that have an available improvement space for enhancement; querying a knowledge base for recommended image enhancements based on the validation parameters for each image having the available improvement space for enhancement; generating a matrix comprising a set of one or more recommended image enhancements and a set of success rates for each enhancement recommended; applying one or more image enhancements selected by a user, to at least one image of the image set having the available improvement space, creating at least one enhanced image; outputting an enhanced image set, wherein the enhanced image set replaces at least one image of the image set with the at least one enhanced image; receiving user feedback critiquing the enhanced image set; and storing user feedback to the knowledge base, improving future recommended image enhancements for images comprising similar validation parameters.

A second embodiment of the present disclosure provides a computer system comprising a processor; and a computer-readable storage media coupled to a processor, wherein the computer readable storage media contains program instructions executing a computer-implemented method comprising the steps of: receiving an image set comprising at least one image, calculating validation parameters for each image of the image set, categorizing each image of the image set based on the validation parameters, wherein the step of categorizing identifies a category of images in the image set that have an available improvement space for enhancement, querying a knowledge base for recommended image enhancements based on the validation parameters for each image having the available improvement space for enhancement, generating a matrix comprising a set of one or more recommended image enhancements and a set of success rates for each enhancement recommended, applying one or more image enhancements selected by a user, to at least one image of the image set having the available improvement space, creating at least one enhanced image, outputting an enhanced image set, wherein the enhanced image set replaces at least one image of the image set with the at least one enhanced image, receiving user feedback critiquing the enhanced image set, and storing user feedback to the knowledge base, improving future recommended image enhancements for images comprising similar validation parameters.

A third embodiment of the present disclosure provides a computer program product comprising: one or more computer readable storage media having computer-readable program instructions stored on the one or more computer readable storage media, said program instructions executes a computer-implemented method comprising the steps of: receiving an image set comprising at least one image, calculating validation parameters for each image of the image set, categorizing each image of the image set based on the validation parameters, wherein the step of categorizing identifies a category of images in the image set that have an available improvement space for enhancement, querying a knowledge base for recommended image enhancements based on the validation parameters for each image having the available improvement space for enhancement, generating a matrix comprising a set of one or more recommended image enhancements and a set of success rates for each enhancement recommended, selecting, by a user, one or more image enhancements from the set of one or more recommended image enhancements of the matrix. applying one or more image enhancements selected by a user, to at least one image of the image set having the available improvement space, creating at least one enhanced image, outputting an enhanced image set, wherein the enhanced image set replaces at least one image of the image set with the at least one enhanced image, receiving user feedback critiquing the enhanced image set, and storing user feedback to the knowledge base, improving future recommended image enhancements for images comprising similar validation parameters.

BRIEF DESCRIPTION OF THE DRAWINGS

FIG. 4b depicts a flow diagram that is a continuation of the operational steps of the computerized method of FIG. 4a.

DETAILED DESCRIPTION

Overview

Figure 1:
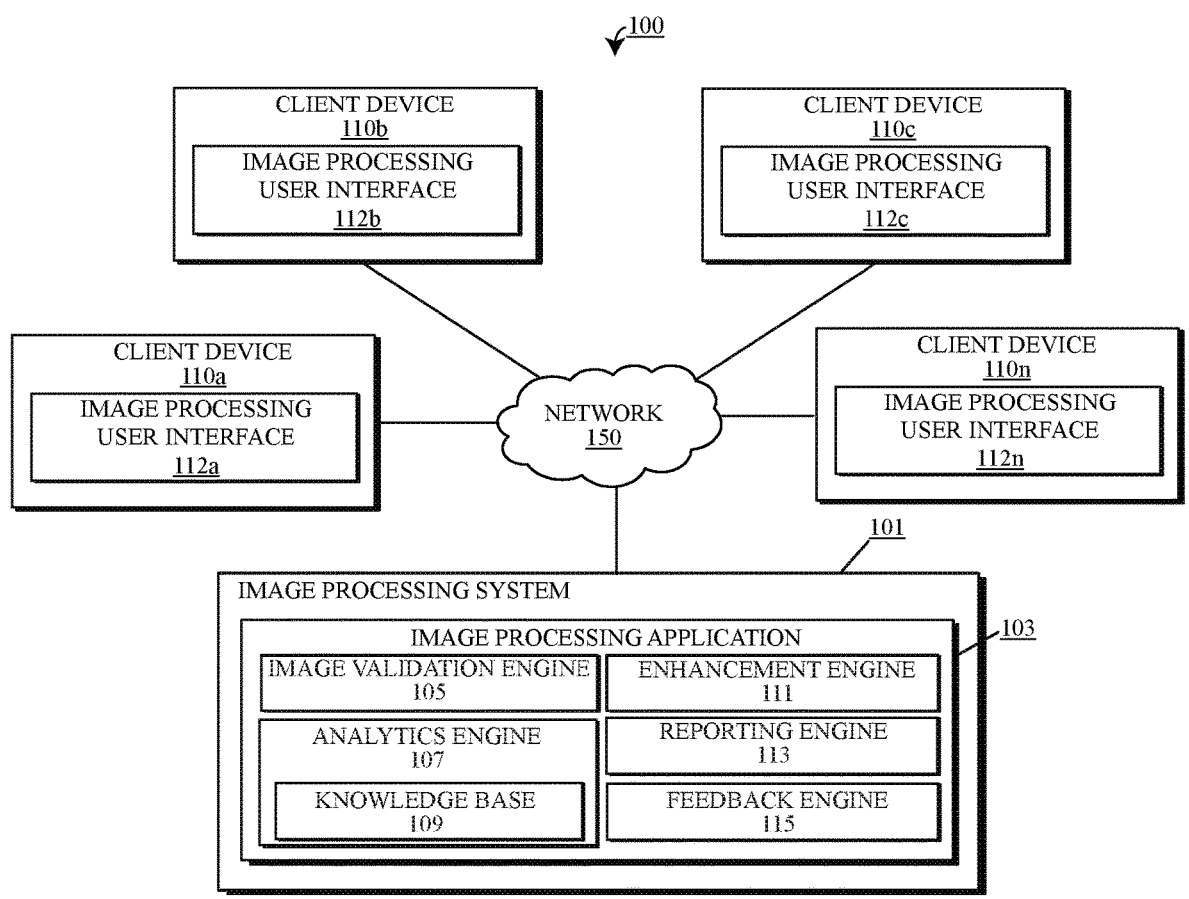
FIG. 1 depicts a functional block diagram describing an embodiment of a computing environment in accordance with the present disclosure.

Traditional models for enhancing images perform uniform enhancement functions across all images of an image set being enhanced. Traditional models of image enhancement deploy standard image enhancement techniques that are limited to processing images in a single passthrough. Traditional image processing systems and software for enhancing images lack flexibility to selectively enhance images dynamically, instead relying heavily on the quality of the ingested images and the image source to successfully and accurately perform feature extraction. Traditional image processing systems pre-process the incoming images using standard image processing techniques such as de-skew, auto-rotate, line removal, noise removal and dilation. Although these standard enhancement techniques can improve readability of documents and other forms of images, these enhancement techniques may not be applicable to all images of an image set. In some cases, the application of the standard techniques to every image in an image set, regardless of the image's unique parameters and attributes can result in degraded quality of the feature extraction intended to be enhanced, due to over-correction.

Embodiments of the present disclosure recognize that traditional image enhancement lacks the flexibility to dynamically cater to the implementation of individual enhancements based on the parameters or attributes of the images and there is a lack of standard algorithms or options for image enhancement of image sets on an image by image basis. Embodiments of the present disclosure improve upon traditional image processing to improve image processing systems and software by leveraging the use of machine learning and artificial intelligence to process image enhancements using one or more image enhancement algorithms determined to be best suited for feature extraction of each image on an individual basis, using the image's validation parameters instead of uniformly applying the same algorithm to each image within the image set.

Embodiments of the present disclosure calculate validation parameters for each image of an image set potentially being enhanced. Based on the calculated validation parameters, such as the dots per inch (DPI) of the image, length, width, image histogram, layers and content distribution, embodiments of the present disclosure may categorize each image. For example, by categorizing the images' quality, using categories such as inferior quality, superior quality and average quality. Inferior images having validation parameters falling below a threshold for processing may be ignored, while superior quality images having one or more validation parameters above a threshold may be processed as part of the image set without further enhancements (unenhanced), due to the already high quality of the images and thus lack an opportunity to benefit from further enhancement. Images identified as being "average" may include images having validation parameters between the threshold of the inferior quality images but below the threshold of a superior quality image. Average image quality may include an improvement space for the image to be enhanced using one or more image processing algorithms or techniques to improve the overall quality of the image.

Embodiments of the present disclosure may utilize a knowledge base 109 comprising historical data describing validation parameters of historical images, as well as enhancement techniques and algorithms applied to each of the historical images, in order to predict algorithms and techniques that may be utilized to enhance images having similar validation properties as the historical images of the knowledge base 109. A probabilistic algorithm may be used to create a matrix from the information described by the knowledge base 109, wherein the matrix comprises one or more recommended image enhancement techniques or algorithms, a success rate for applying the suggested enhancement technique or algorithm and/or a rate of improvement that might be expected from applying the suggested enhancement technique or algorithm. Each image of an image set may be analyzed individually and a separate matrix of suggested algorithms or techniques for enhancing the image may be generated for each proposed enhancement. Embodiments of the present disclosure may present the matrices of image enhancements to users and allow users to individually select and validate which enhancements to apply to each image of the image set.

In some embodiments, users may manually select a technique or algorithm to apply to an image and/or override the suggestions presented as matrices created using the knowledge base. Upon applying the selected techniques or algorithms and outputting an enhanced image set to a user interface, the embodiments of the present disclosure may receive user feedback directed toward the enhancements applied to the images. The user feedback may be a positive or negative reaction of the user in response to the outputted enhanced images received. User feedback may be stored by the knowledge base 109 and help to further refine the decision-making process and models of the analytics engine 107 selecting techniques or algorithms for future image sets, constantly improving the knowledge base 109 and decision making of the analytics engine 107, to make more accurate decisions and recommendations to the users seeking to perform image enhancements.

System Selecting and Applying Image Enhancements

Although certain embodiments are shown and described in detail, it should be understood that various changes and modifications may be made without departing from the scope of the appended claims. The scope of the present disclosure will in no way be limited to the number of constituting components, the materials thereof, the shapes thereof, the relative arrangement thereof, etc., and are disclosed simply as an example of embodiments of the present disclosure. A more complete understanding of the present embodiments and advantages thereof may be acquired by referring to the following description taken in conjunction with the accompanying drawings, in which like reference numbers indicate like features.

As a preface to the detailed description, it should be noted that, as used in this specification and the appended claims, the singular forms "a", "an" and "the" include plural referents, unless the context clearly dictates otherwise.

Figure 2:
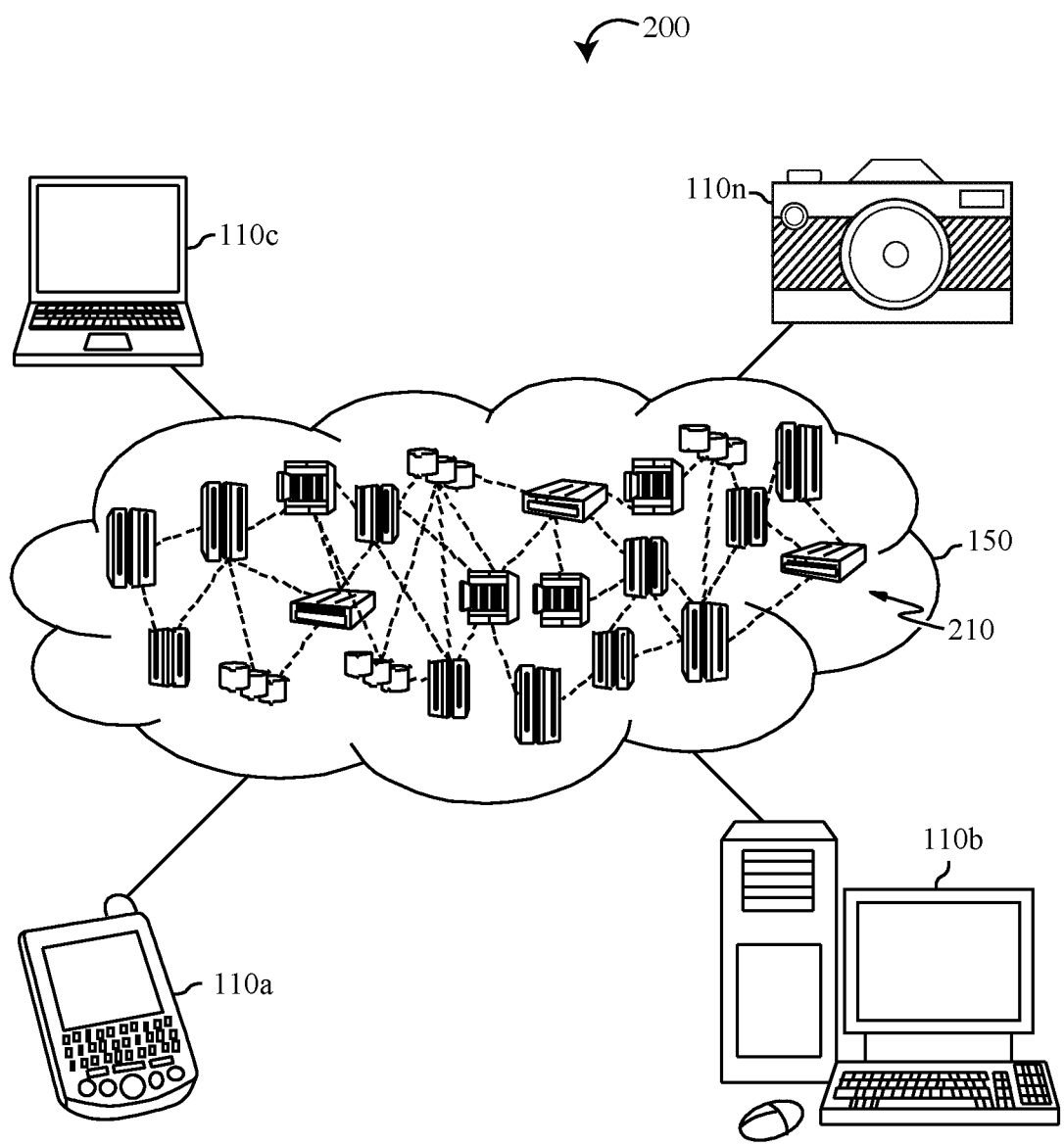
FIG. 2 depicts an embodiment of a cloud computing environment in accordance with the present disclosure.
Figure 3:
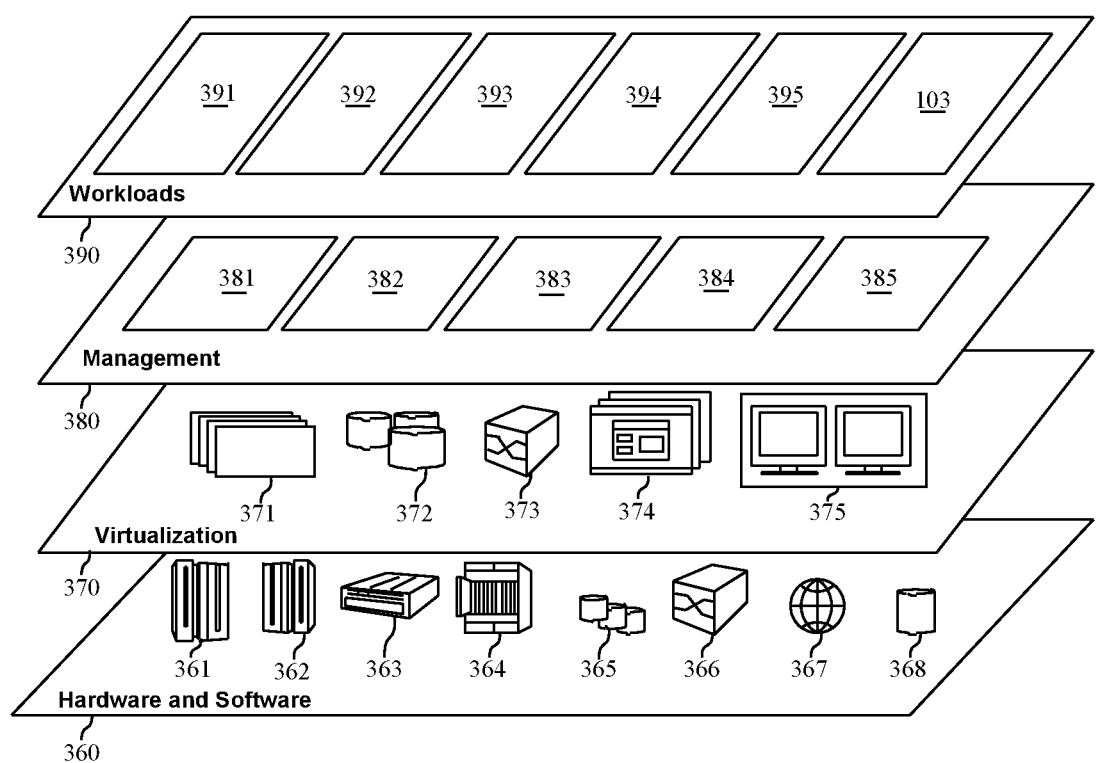
FIG. 3 depicts an embodiment of abstraction model layers of a cloud computing environment in accordance with the present disclosure.

Referring to the drawings, FIGS. 1-3 depict diagrams of a computing environment 100, 200 capable of identifying, selecting and applying one or more image enhancements to one or more images of an inputted image set. The term "image enhancement" may describe a process of digitally manipulating images and the properties thereof. For example, using different kinds of tools, including software that applies filters, convolutions and transformations to the image. Embodiments of computing environment 100, 200 may include a plurality of computing systems and devices interconnected via a computer network 150, such as image processing system 101, one or more client devices 110a, 110b, 110c, 110n (referred to generally as "client device 110") and/or one or more network accessible systems such as a general purpose computer system 500, described in detail in the COMPUTER SYSTEM section below.

Figure 5:
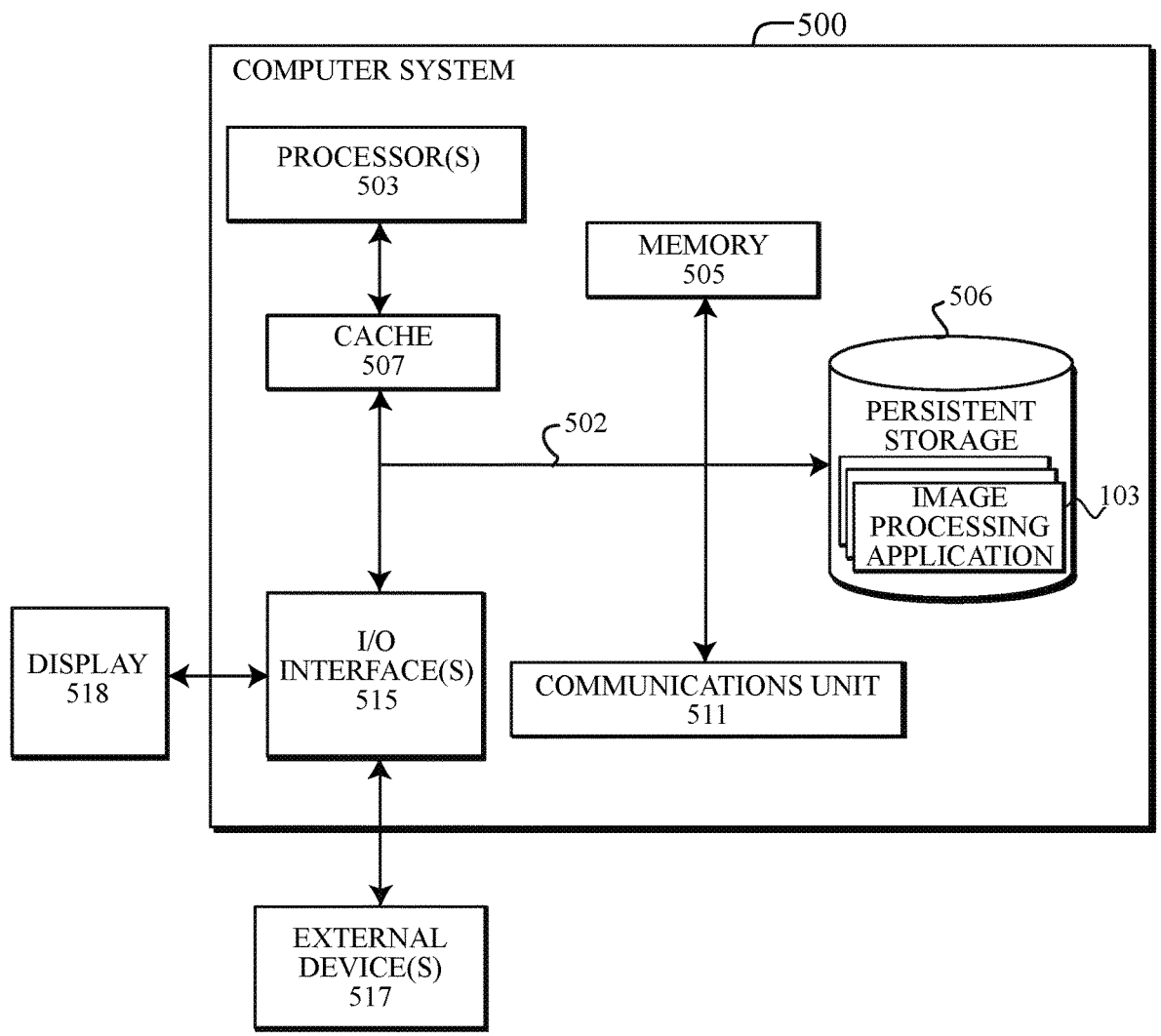
FIG. 5 depicts an embodiment of a block diagram of internal and external components of a computer system in accordance with the embodiments of the present disclosure.

Image processing system 101, client device 110 and network accessible systems such as network accessible repositories or additional network-enabled computer systems 500, may each be a specialized computing system comprising specialized configurations of hardware, software or a combination thereof, as shown and described in FIGS. 1-3 of the present disclosure and in embodiments described herein. Embodiments of the image processing system 101 and client device 110 may not only comprise the specialized components and software of the computing environment 100, 200 depicted in FIGS. 1-3, but may also incorporate one or more elements of a computer system 500, as shown in FIG. 5. One or more components of the computer system 500 may be integrated into each of the specialized computer systems of computing environment 100, 200, including the integration of one or more processor(s) 503, memory 505, persistent storage 506, cache 507, communications fabric 502, communications unit 511, I/O interface(s) 515, external device(s) and/or human-readable display(s) 518.

Embodiments of the image processing system 101 and client device 110 may be desktop computers, laptop computers, tablet computers, mobile communication devices (such as a smartphone or cellular telephone), network enabled internet of thing (IOT) devices and sensors, wearable computing devices (such as smart watches or smart glasses), servers, or any other type of computer system known by persons skilled in the art. In some embodiments, image processing system 101, client device 110 and other network accessible systems, may represent computers and components acting as a single pool of seamless resources when accessed through network 150. For example, such embodiments may be used in a data center, cloud computing environment 200, storage area network (SAN), and network attached storage (NAS) applications. In certain embodiments, image processing system 101, client device 110, and other network accessible systems may represent virtual machines provisioned by a host computer on the network 150. For example, image processing system 101 or another network accessible computer system 500 hosting a plurality of client devices 110 operating as virtual machines, each accessing image processing application 103 hosted by image processing system 101. In general, image processing system 101, client device 110 and other network accessible systems may be representative of any electronic devices, or combination of electronic devices, capable of executing machine-readable program instructions, as described in greater detail with regard to FIGS. 4a-4b below.

Embodiments of image processing system 101, client device 110, and other network accessible systems, may each be connected and placed into communication with one another over computer network 150. Embodiments of computer network 150 may be constructed using wired, wireless or fiber optic connections. As shown in the exemplary embodiments, image processing system 101, client device 110, and other network accessible systems, may connect and communicate over network 150 using a communications unit 511, such as a network interface controller or other network communication hardware. Embodiments of the communications unit 511 may implement specialized electronic circuitry allowing for communication using a specific physical layer and a data link layer standard. For example, Ethernet, Fiber channel, Wi-Fi or Token Ring. Communications unit 511 may further allow for a full network protocol stack, enabling communication over network 150 to the group of computer systems or other computing hardware devices linked together through the communication channels. The network 150 may facilitate communication and resource sharing among image processing system 101, client device 110, and other network accessible systems connected to the network 150. Examples of network 150 may include a local area network (LAN), home area network (HAN), wide area network (WAN), back bone networks (BBN), peer to peer networks (P2P), campus networks, enterprise networks, the Internet, cloud computing networks and any other network known by a person skilled in the art.

Cloud computing is a model of service delivery for enabling convenient, on-demand network 150 access to a shared pool of configurable computing resources (e.g., networks, network bandwidth, servers, processing, memory, storage, applications, virtual machines, and services) that can be rapidly provisioned and released with minimal management effort or interaction with a provider of the service. A cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications such as image processing application 103, running on a cloud infrastructure. The applications are accessible from various client devices 110 through a user interface (i.e. image processing user interface 112a, 112b, 112c, 112n referred to generally as "image processing user interface 112") such as a thin client interface. For example, using a web browser to access the application through user portal. The consumer does not manage or control the underlying cloud infrastructure including networks, servers, operating systems, storage, or even individual application capabilities, with the possible exception of limited user-specific application configuration settings. In general, a user interface may be a space where interactions between humans and machines occur. Image processing user interface 112 may be a graphical user interface (GUI) or a web user interface (WUI) and can display text, documents, web browser windows, user options, application interfaces, and instructions for operation, and include the information (such as graphic, text, and sound) that a program (such as the image processing application 103) presents to a user and the control sequences the user employs to control the program. Embodiments of the image processing user interface 112 may also be mobile application software that provides an interface between a user of client device 110 and network 150. Mobile application software, or an "app," is a computer program designed to run on smartphones, phablets, tablet computers and other mobile devices.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment 200 is service oriented with a focus on statelessness, low coupling, modularity, and semantic interoperability. At the heart of cloud computing is an infrastructure that includes a network of interconnected nodes.

Referring to the drawings, FIG. 2 is an illustrative example of a cloud computing environment 200. As shown, cloud computing environment 200 includes one or more cloud computing nodes 210 with which client devices 110 operated by cloud consumers may communicate. Exemplary embodiments of client devices 110 are shown in FIG. 2, including (but not limited to) a mobile communication device (i.e. smartphone or cellular telephone) 110a, desktop computer 110b, laptop computer 110c, and/or any other unconventional computing or IOT devices, such as an image capturing device (i.e. a camera) 110n. Nodes 210 may communicate with one another and may be grouped (not shown) physically or virtually, in one or more networks, such as Private, Community, Public, or Hybrid clouds as described hereinabove, or a combination thereof. This may allow cloud computing environment 200 to offer infrastructure, platforms and/or software as services for which a cloud consumer does not need to maintain resources locally on a client device 110. It is understood that the types of client devices 110 shown in FIG. 2 are intended to be illustrative only and that computing nodes 210 and cloud computing environment 200 can communicate with any type of computerized device over any type of network and/or network addressable connection (e.g., using a web browser).

Referring now to FIG. 3, a set of functional abstraction layers provided by cloud computing environment 200 is shown. It should be understood in advance that the components, layers, and functions shown in FIG. 3 are intended to be illustrative only and embodiments of the invention are not limited thereto. As depicted, the following layers and corresponding functions are provided:

Hardware and software layer 360 includes hardware and software components. Examples of hardware components include: mainframes 361; RISC (Reduced Instruction Set Computer) architecture-based servers 362; servers 363; blade servers 364; storage devices 365; and networks and networking components 366. In some embodiments, software components include network application server software 367 and database software 368.

Virtualization layer 350 provides an abstraction layer from which the following examples of virtual entities may be provided: virtual servers 351; virtual storage 372; virtual networks 373, including virtual private networks; virtual applications and operating systems 374; and virtual clients 375.

In one example, management layer 380 may provide the functions described below. Resource provisioning 381 provides dynamic procurement of computing resources and other resources that are utilized to perform tasks within the cloud computing environment 200. Metering and pricing 382 provide cost tracking as resources are utilized within the cloud computing environment 200, and billing or invoicing for consumption of these resources. In one example, these resources can include application software licenses. Security provides identity verification for cloud consumers and tasks, as well as protection for data and other resources. User portal 383 provides access to the cloud computing environment 200 for cloud consumers and system administrators. Service level management 384 provides cloud computing resource allocation and management such that required service levels are met. Service Level Agreement (SLA) planning and fulfillment 385 provide pre-arrangement for, and procurement of, cloud computing resources for which a future requirement is anticipated in accordance with an SLA.

Workloads layer 390 provides examples of functionality for which the cloud computing environment may be utilized. Examples of workloads and functions which may be provided from this layer include: machine learning 391 engines; software development and lifecycle management 392; data curation 393; data analytics processing 394; report processing 395 and image processing application 103.

Embodiments of the computing environments 100, 200 may include an image processing system 101 performing one or more tasks or functions associated with capturing or receiving images, calculating an image's validation parameters and then selecting, applying and displaying image enhancements, as described in detail throughout this disclosure. In the exemplary embodiment of FIG. 1, the image processing system 101 may be loaded with an image processing application 103, which may provide image enhancement services to each client device 110 accessing image processing application 103. Embodiments of the image processing application 103 may be locally stored on the persistent storage 706 of each individual client device 110 in some embodiments of computer environment 100, 200. In other embodiments, client devices 110 may remotely access the image processing application 103 being maintained by the image processing system 101 or another network accessible computer system loaded with the image processing application 103, such as an application server connected to network 150.

Embodiments of the image processing application 103 may include one or more processes or services operating as part of the image processing application 103, each specializing in the performance of specific tasks or functions, including calculating validation parameters of images, recommending one or more image enhancements based on the validation parameters, presenting proposed image enhancements along with a rate of successful application of the image enhancement, processing images using a selected image enhancement algorithm or technique, displaying the enhanced image sets to users and updating a knowledge base 109 based on user feedback to improve future image enhancement suggestions. Embodiments of the image processing application 103 may include a plurality of engines, which may each comprise a set of components, services and/or programs, which may be part of or linked to the program code implemented by the image processing application 103. In the exemplary embodiment of the image processing application 103, the image processing application 103 may include an image validation engine 105, analytics engine 107, knowledge base 109, enhancement engine 111, reporting engine 113 and/or feedback engine 115.

Embodiments of the image validation engine 105 may perform functions or tasks of the image processing application 103 directed toward pre-processing images of an image set and calculating one or more validation parameters associated with each image ingested by the image processing application 103. A validation parameter may refer to the properties of the image that may define one or more of the image's attributes. Embodiments of the validation parameters may describe the dimensions, shape, orientation, quality and data measurements that may be used to create the image. Embodiments of image validation parameters may include the attributes of pixel density (i.e. dots per inch (DPI) of the pixels that make up the image), image dimensions such as the length and the width of the image, pixel distribution, total number of pixels, pixel $$\text{size}\left(\frac{\text{image size (mm)}}{\text{matrix size (pixels)}}\right),$$

bit depth, image rotation, image layers, content distribution of the image, histogram of the image, brightness, contrast, edge detection, field of view (total number of pixels*pixel size), pixel shape, sharpness, noise level, signal-to-noise ratio, statistical measurements such as mean, median, mode, variance, standard deviations, covariance, skewness and kurtosis of an image and any other validation parameter that may be known or used by a person skilled in the art.

Images inputted into the image processing application 103 may be assessed for image quality at the pre-processing stage using the validation parameters calculated by the image validation engine 105. Embodiments of the image validation engine 105 may categorize each image inputted using the calculated validation parameters as a sorting mechanism. In the exemplary embodiment of the computer environment 100, 200, the image validation engine 105 may categorize the quality of each image as inferior, average and/or superior. The inferior image category may refer to images inputted into the image processing application 103 that include validation parameters that may prevent image enhancement from occurring, the validation parameters are below a processable threshold level that would result in a lack of improvement and/or applying enhancements may result in further degradation to the already inferior image quality. For example, an inferior image can comprise an insufficient number of bits in the digital representation of the image suffering from too few pixels and/or too small of a bit depth, which are below a threshold level for an enhancement to improve the overall image quality. In another example, an image within an image set that is completely or partially redacted. The image validation engine 105 marks the image as inferior due to the redacted area(s) of the image that are preventing enhancement to the image. A redacted image being processed using one or more enhancement algorithms and techniques could still result in a redacted image being outputted. Therefore, applying an enhancement could be considered redundant and pointless. Images validated by the image validation engine 105 to be inferior quality may be ignored by the image processing application 103 during downstream stages of image processing, including stages of image enhancement recommendation, selection and application of selected enhancements.

On the other end of the quality categorization spectrum, embodiments of an image set may comprise one or more images categorized by the image validation engine 105 as being superior quality. A superior quality image may include validation parameters calculated to have above average image qualities. For example, images having a high DPI (i.e. high resolution compared to the size of the image), proper data distribution across the image, a high number of total pixels, an optimal signal-to-noise ratio, good edge detection, etc. Images categorized as superior quality by the image validation engine 105 may be marked by the image validation engine 105 as a "good sample". Embodiments of the image validation engine 105 may process each of the superior quality images of an image set as-is, without further processing or enhancements being suggested or applied by the image processing application 103. Further application of image enhancements to a superior quality image may degrade, reduce or distort the image's validation parameters and result in an image quality that appears degraded compared with the original superior quality image. Therefore, embodiments of the image processing application 103 may output superior quality images to the user, untouched, without further enhancements.

Embodiments of the image validation engine 105 may apply the categorization of "average" to images that may have one or more calculated validation parameters that reside above the processable threshold limit of an inferior quality image, but may be less than a threshold of being considered a superior quality image. Embodiments of images categorized within the average category of image quality may be identified by the image validation engine 105 as having an improvement space, which may benefit from applying one or more enhancement algorithms and/or techniques to improve the overall image quality. In some embodiments, the improvement space may be identified on an individual validation parameter basis. Some images may have validation parameters that indicate superior image quality in some attributes, but room for improvement based on another set of one or more validation parameters. Embodiments of the image validation engine 105 may isolate one or more validation parameters as an area for improvement, and therefore still categorize the image as average, subsequently concentrating enhancement recommendations to the isolated areas identified as the improvement space of the image.

Embodiments of the image processing application 103 may further comprise an analytics engine 107. Embodiments of the analytics engine 107 may incorporate the use of mathematics, statistics, predictive modeling and machine learning techniques to find meaningful patterns between the validation parameters calculated by the image validation engine 105 and one or more image enhancing algorithms or technique known by a knowledge base 109 of the analytics engine 107 that may improve the overall quality of the image as a result of the application of the image enhancement. Embodiments of the analytics engine 107 may receive input from the image validation engine 105 comprising the calculated validation parameters of each image inputted into the image processing application 103. Embodiments of the validation parameters may form the basis of a query to the knowledge base 109. Based on the historical records of the knowledge base 109, which may comprise historical data describing historically inputted images and image sets, historical validation parameters, records of historically applied enhancements to images having said historical validation parameters and the results of the application of said historically applied enhancements, the analytics engine 107 may draw one or more conclusions regarding image enhancements to recommend for application to the inputted images being received. Moreover, the analytics engine 107 may also draw conclusions about the probability of successfully achieving an improvement to the image quality, and/or and anticipated success rate for each image enhancement suggested.

As shown in the exemplary embodiment of FIG. 1, embodiments of the analytics engine 107 may include an integrated knowledge base 109. In alternative embodiments of the analytics engine 107, the knowledge base 109 may be a standalone software application accessible to the analytics engine 107. For example, by installing the knowledge base 109 on a network accessible repository or remotely accessible server connected to network 150. The term "knowledge base 109" may refer to a human readable or machine-readable resource for disseminating and optimizing information collection, organization and retrieval. The knowledge base 109 may draw upon the knowledge of humans and artificial intelligence, that has been inputted into the knowledge base 109 in a machine-readable form and may be structured as a database in some embodiments. Embodiments of the knowledge base 109 may be used to find solutions to current and future problems by using the data inputted into the knowledge base 109 from past experiences to make informed decisions and/or recommendations to a user or administrator of the image processing system 101.

Embodiments of the knowledge base 109 may not be simply a static collection of information. Rather, the knowledge base 109 may be a dynamic resource having the cognitive capacity for self-learning, using one or more data modeling techniques and/or by working in conjunction with one or more machine learning programs to improve recognition of image enhancements having a high probability of successfully improving the image quality based on the calculated validation parameters of the image. Embodiments of the knowledge base 109 may apply problem solving logic and use one or more problem solving methods to provide a justification for conclusions reached by the knowledge base 109 when recommending one or more image enhancement algorithms or techniques.

Exemplary embodiments of knowledge base 109 may be a machine-readable knowledge base 109 that may receive, and store images and/or image sets inputted into image processing system 101, along with each image's associated validation parameters calculated by the image validation engine 105. Image and/or image sets, validation parameters, applied image enhancements, results of the image enhancement algorithms and/or techniques along with any user feedback, may be stored as part of one or more database records. The collection of historical image processing data creates a historical compilation of previously processed images and results that can be applied to making future predictions. The analytics engine 107 may query the knowledge base's historical records of previously processed images to determine which image enhancements may be most probable to result in an improvement to the quality of the pre-processed images being inputted into the image processing application 103. Embodiments of the analytics engine 107 may update the records of the knowledge base 109 each time an image is processed and/or upon receiving feedback from a user critiquing the outcome of an enhancement of an image based on the historical records of the knowledge base 109. The knowledge base 109 may perform automated deductive reasoning, machine learning or a combination of processes thereof in response to a query performed by the analytics engine 107 in order to narrow down the information stored by the knowledge base 109 and to arrive at a solution suggesting one or more image enhancement algorithms or techniques to apply to each image inputted into the image processing system 101.

Embodiments of a knowledge base 109 may comprise a plurality of components to operate and make decisions directed toward potential image enhancement recommendations. Embodiments of the knowledge base 109 may include components such as a facts database, rules engine, a reasoning engine, a justification mechanism and a knowledge acquisition mechanism. The facts database may contain the knowledge base's 109 current fact pattern of a particular situation, which may comprise data describing a set of observations about an image or image set being pre-processed. For example, the image validation parameters calculated by the image validation engine 105 and the categorization of the image.

Embodiments of the rules engine of knowledge base 109 may be a set of universally applicable rules that may be created based on the experience and knowledge of the practices of experts, developers, programmers and/or contributors to knowledge base 109. The rules created by the rules engine may be generally articulated in the form of if-then statements or in a format that may be converted to an if-then statement. The rules of knowledge base 109 may be fixed in such a manner that the rules may be relevant to all or nearly all situations covered by the knowledge base 109. While not all rules may be applicable to every situation being analyzed by the knowledge base 109, where a rule is applicable, the rule may be universally applicable.

Embodiments of the reasoning engine of knowledge base 109 may provide a machine-based line of reasoning for solving problems, such as deciding which image enhancement algorithms and techniques may provide the best solution for improving the image's quality based on the calculated validation parameters. The reasoning engine may process the facts in the fact database and the rules of the knowledge base 109. In some embodiments of the knowledge base 109, the reasoning engine may also include an inference engine which may take existing information in the knowledge base 109 and the fact database, then use both sets of information to reach one or more conclusions and/or implement an action. Embodiments of the inference engine may derive new facts from the existing facts of the facts database using rules and principles of logic.

Embodiments of the justification mechanism of the knowledge base 109 may explain and/or justify how a conclusion by knowledge base 109 was reached. The justification mechanism may describe the facts and rules that were used to reach the conclusion. Embodiments of the justification mechanism may be the result of processing the facts of a current situation in accordance with the entries of the knowledge base 109, the reasoning engine, the rules and the inferences drawn by the knowledge base 109. The knowledge acquisition mechanism of the knowledge base 109 may be performed by a manual creation of the rules, a machine-based process for generating rules or a combination thereof.

Embodiments of analytics engine 107 may utilize and apply one or more machine learning techniques, either in conjunction with or as part of knowledge base 109, to arrive at one or more recommended algorithms and/or techniques that may be applied to images inputted into the image processing system 101. Machine learning may refer to a method of data analysis that may automate analytical model building, allowing for computer systems such as image processing system 101 to learn from the image data inputted and analyzed by the analytics engine 107, including past instances of historical image processing of one or more images having similar validation parameters to the present images being pre-processed by the analytics engine 107, in order to justify patterns and make decisions about the image enhancement algorithms and/or techniques to propose applying to the images presented for processing. The identification of patterns and decisions about the proposed selection and recommended image enhancement algorithms and techniques may be made with minimal intervention by a human user and/or systems administrator. In some embodiments, of the image processing system 101, the analytics engine 107 may incorporate techniques of data mining, deep learning, and data clustering to enhance or replace machine learning techniques being applied to the image data by the analytics engine 107.

Embodiments of machine learning techniques that may be implemented by analytics engine 107 to identify appropriate image enhancement algorithms or techniques using the knowledge of the knowledge base 109 may include supervised learning, unsupervised learning and/or semi-supervised learning techniques. Supervised learning is a type of machine learning that may use one or more computer algorithms to train the analytics engine 107 using labelled examples during a training phase. The term "labelled example" may refer to the fact that during the training phase, there are desired inputs that will produce a known desired output by the analytics engine 107. The algorithm of the analytics engine 107 may be trained by receiving a set of inputs (i.e. image validation parameters and/or image categorization) along with the corresponding correct outputs. To employ supervised learning, the analytics engine 107 may store a labelled dataset for learning, a dataset for testing and a final dataset from which the analytics engine may use for making suggestions or predictions about the most suitable image enhancements to apply, and the expected success rates for each proposed image enhancement.

The machine learning algorithm(s) of analytics engine 107 may learn by comparing the actual output with the correct outputs in order to find errors. The analytics engine 107 may modify the model of data according to the correct outputs to refine the decision making of the analytics engine 107, improving the accuracy of the automated decision making to provide the correct inputs. During the training phase, analytics engine 107 may learn the correct outputs by analyzing and describing well known data and information, that may be stored by the records of knowledge base 109. For example, records describing image or image sets, validation parameters, image enhancements applied, statistics of user's selecting presented image enhancements, the resulting quality of the image enhancements applied and user feedback to the application of the image enhancements. Examples of data modeling algorithms may include classification, regression, prediction and gradient boosting.

Unsupervised learning techniques on the other hand may be used when there may be a lack of historical data available. Machine learning that is unsupervised may not be "told" which input or output is the correct answer the way supervised learning algorithms do. Instead, during unsupervised learning, the algorithm may explore the data to find a common structure between each of the images explored and the associated validation parameters. Embodiments of an unsupervised learning algorithm can identify common attributes between each of the images being analyzed, gather feedback from users and refine the decisions of analytics engine 107 to improve future image enhancement recommendation decisions. Examples of unsupervised machine learning may include self-organizing maps, nearest-neighbor mapping, k-means clustering, and singular value decomposition.

Embodiments of the analytics engine 107 may also incorporate the use of semi-supervised learning techniques in some situations. Semi-supervised learning may be used for the same applications as supervised learning. However, instead of using entirely labelled training examples of data during the training phase, there may be a mix of labelled and unlabeled examples during the training phase. For example, there may be a small or limited amount of labelled data being used as examples (i.e., there may be a small amount of records describing historically applied image enhancements) alongside a larger amount of unlabeled data that may be presented to the analytics engine 107 during the training phase. Suitable types of machine learning techniques that may use semi-supervised learning may include classification, regression and prediction models.

Using the collective knowledge of knowledge base 109 and one or more machine learning techniques described above, embodiments of analytics engine 107 may output recommendations for algorithms and techniques to apply as an image enhancement. In some embodiments, depending on the type of image enhancement being recommended, the recommendations being outputted may include a matrix, a formula and/or a predicted success rate for improving the quality of the image being enhanced. Examples of algorithms and techniques that may be identified by the analytics engine 107 for application to the images are described below, including examples of the matrices and formulas that may be used for applying the image enhancement, as well as a brief description describing scenarios wherein the image enhancement may be considered advantageous to apply.

Embodiments of analytics engine 107 may recommend applying one or more digital filters as an image enhancement technique or algorithm. A digital filter may be described as a system that performs mathematical operations on a discrete and sampled time signal to enhance or reduce certain aspects of that signal. Digital filters may be used in image processing to blur or sharpen digital images, improve edge detection, embossing, reducing noise, etc. Filtering can be performed in the spatial domain by convolution using specifically designed kernels (referred to as convolution matrices). In some embodiments image kernels may also be used in machine learning for feature extraction, to determine the most important portions of the image through the use if convolutional neural networks. The general expression of a convolution may be presented using the formula $g(x,y)=\omega * f(x,y)=\sum_{s=-a}^{a}\sum_{t=-b}^{b}\omega(s,t)f(x-s,y-t)$, wherein $g(x,y)$ is the filtered image, $f(x,y)$ is the original image, $\omega$ is the filter kernel and each element of the filter kernel is considered by $-a \leq s \leq a$ and $-b \leq t \leq b$. Each block of pixels (depending on the kernel size) in an image may be multiplied by the corresponding entry of the kernel's matrix, and then the sum is taken. The sum becomes the new pixel for the enhanced version of the image. Table 1 provides an example of types of image enhancements using convolutions and the associated matrices of kernel $\omega$ for each filter operation.

TABLE 1

| Digital Filter-Convolutions | |
|---|---|
| Filter Operation | Kernel |
| Edge Detection | $\begin{bmatrix} 1 & 0 & -1 \\ 0 & 0 & 0 \\ -1 & 0 & 1 \end{bmatrix}$ |
| | $\begin{bmatrix} 0 & 1 & 0 \\ 1 & -4 & 1 \\ 0 & 1 & 0 \end{bmatrix}$ |
| | $\begin{bmatrix} -1 & -1 & -1 \\ -1 & 8 & -1 \\ -1 & -1 & -1 \end{bmatrix}$ |
| Laplacian Edge Detection | $\begin{bmatrix} 0 & -1 & 0 \\ -1 & 4 & -1 \\ 0 & -1 & 0 \end{bmatrix}$ |
| Sharpen | $\begin{bmatrix} 0 & -1 & 0 \\ -1 & 5 & -1 \\ 0 & -1 & 0 \end{bmatrix}$ |

TABLE 1-continued

| Digital Filter-Convolutions | |
|---|---|
| Filter Operation | Kernel |
| Bottom Sobel | $\begin{bmatrix} -1 & -2 & -1 \\ 0 & 0 & 0 \\ 1 & 2 & 1 \end{bmatrix}$ |
| Top Sobel | $\begin{bmatrix} 1 & 2 & 1 \\ 0 & 0 & 0 \\ -1 & -2 & -1 \end{bmatrix}$ |
| Left Sobel | $\begin{bmatrix} 1 & 0 & -1 \\ 2 & 0 & -2 \\ 1 & 0 & -1 \end{bmatrix}$ |
| Right Sobel | $\begin{bmatrix} -1 & 0 & 1 \\ -2 & 0 & 2 \\ -1 & 0 & 1 \end{bmatrix}$ |
| Emboss | $\begin{bmatrix} -2 & -1 & 0 \\ -1 & 1 & 1 \\ 0 & 1 & 2 \end{bmatrix}$ |
| Outline | $\begin{bmatrix} -1 & -1 & -1 \\ -1 & 8 & -1 \\ -1 & -1 & -1 \end{bmatrix}$ |
| Blur | $\begin{bmatrix} 0.0625 & 0.125 & 0.0625 \\ 0.125 & 0.25 & 0.125 \\ 0.0625 & 0.125 & 0.0625 \end{bmatrix}$ |
| Box Blur (3 × 3 Mean Blur) | $\frac{1}{9}\begin{bmatrix} 1 & 1 & 1 \\ 1 & 1 & 1 \\ 1 & 1 & 1 \end{bmatrix}$ |
| Gaussian Blur (3 × 3) | $\frac{1}{16}\begin{bmatrix} 1 & 2 & 1 \\ 2 & 4 & 2 \\ 1 & 2 & 1 \end{bmatrix}$ |
| Gaussian Blur (5 × 5) | $\frac{1}{256}\begin{bmatrix} 1 & 4 & 6 & 4 & 1 \\ 4 & 16 & 24 & 16 & 4 \\ 6 & 24 & 36 & 24 & 6 \\ 4 & 16 & 24 & 16 & 4 \\ 1 & 4 & 6 & 4 & 1 \end{bmatrix}$ |
| Unsharp Masking | $\frac{-1}{256}\begin{bmatrix} 1 & 4 & 6 & 4 & 1 \\ 4 & 16 & 24 & 16 & 4 \\ 6 & 24 & -476 & 24 & 6 \\ 4 & 16 & 24 & 16 & 4 \\ 1 & 4 & 6 & 4 & 1 \end{bmatrix}$ |

Additional types of filters that may be recommended may be based on one or more statistical functions. For example, a mean can be the most basic statistical measurement that is calculated. In image processing, calculating a mean may be useful for performing spatial filtering to remove various types of noise during image processing (noise reduction). Arithmetic mean filters operate using a sliding window calculating the average of all pixel values within the window and replacing the center pixel value in the destination image with the result. A mathematical formula for calculating the arithmetic mean filter can be described as $$f(x, y) = \frac{1}{mn} \sum_{(r,c) \in W} g(r, c),$$

wherein g is the "noisy image", f(x,y) is the restored image, "r" is the row coordinate, "c" is the column coordinate, "W" is the window of size "m×n", where "m" number of rows and "n" number of columns where the enhancement operation takes place. The result of the arithmetic mean filter is a certain amount of blurring of the image, proportional to the window size, reducing the effects of noise and local variations. Arithmetic mean filtering may be suggested and work best for removing Gaussian, uniform and Erlang noise.

A geometric mean filter is a variation of an arithmetic mean filter. Geometric mean filters are primarily used on images with Gaussian noise. Each restored pixel is given by the product of the pixel within the sub image window raised to the power of "1/mn". The mathematical formulation of a geometric mean filter may be calculated as follows:

$$f(x, y) = [\Pi_{(r,c) \in W} g(r_r c)]^{\frac{1}{mn}}.$$

Another type of filter that may be recommended is a harmonic mean filter, which is another variation of the arithmetic mean filter. Harmonic mean filters may be useful for enhancing images comprising Gaussian or "salt noise" but not black pixels ("pepper noise"). The Harmonic filter's formula may be described as follows:

$$f(x, y) = \frac{mn}{\sum_{(r,c) \in W} \left(\frac{1}{g(r,c)}\right)}.$$

Additional statistical functions for applying filter enhancements, along with the associated formula and some potential use(s) are described in Table 2 provided below:

TABLE 2

| Filter | Enhancement Use(s) | Formula |
|---|---|---|
| Contraharmonic Mean Filter | Filters salt or pepper noise (but not both). +R = salt noise −R = pepper noise | $f(x, y) = \frac{\sum_{(r,c) \in W} (g(r, c))^{R+1}}{\sum_{(r,c) \in W} (g(r, c))^R}$ <br> Wherein R is the order of filter. +R = filter salt noise, −R = filters pepper noise |
| Median Filter Measures intensity level of pixel which is separating high intensity value pixels from lower intensity value pixels. | Filters salt and pepper noise. Sorts all values within the window, finds median value and replaces original pixel with median value | $\tilde{f}(x, y) = \text{median}\{g(r, c) \mid (r, c) \in W\}$ |
| Max and Min Filter Replaces Reference pixel with highest value in the window (max) or lowest value (min) | Max—filter pepper noise Min—filter salt noise | $\tilde{f}(x, y) = \min\{g(r, c) \mid (r, c) \in W\}$ <br> $\tilde{f}(x, y) = \max\{g(r, c) \mid (r, c) \in W\}$ |
| Mid-Point Filter Calculates average of highest and lowest pixel values within a window, combines order statistics and averages into one filter | Reduce Gaussian and uniform noise | $\tilde{f}(x, y) = \frac{1}{2}[\max\{g(r, c) \mid (r, c) \in W\} + \min\{g(r, c) \mid (r, c) \in W\}]$ |
| Alpha-Trimmed Mean Filter Average of pixel values closest to the median after 'D' lowest and 'D' highest values in an ordered set are excluded | Image corruption by more than one type of noise (e.g. salt & pepper and Gaussian) | $\tilde{f}(x, y) = \frac{1}{mn - 2D} \sum_{(r,c) \in W} g(r, c)$ <br> Where D is the number of pixel values excluded at each end of the ordered set, from 0 to (mn−1)/2 |
| Standard Deviation Filter Shows amount of dispersion from the average pixel intensity. Assigns standard deviation to center pixel of output map | Edge sharpening | $\tilde{f}(x, y) = \sqrt{\frac{1}{mn - 1} \sum_{(r,c) \in W} \left(g(r, c) - \frac{1}{mn - 1} \sum_{(r,c) \in W} g(r, c)\right)^2}$ |
| Covariance Filter | Edge sharpening Appearance-based face detection Image orientation | $\text{Cov}(x, y) = \frac{1}{N} \sum (x_i - \bar{x})(y_i - \bar{y})$ |

TABLE 2-continued

Statistical Measures for Filtration

| Filter | Enhancement Use(s) | Formula |
|---|---|---|
| Variance | Edge position | $\tilde{f}(x, y) = \frac{1}{mn-1} \sum_{(r,c) \in W} \left( g(r, c) - \frac{1}{mn-1} \sum_{(r,c) \in W} g(r, c) \right)^2$ |
| Skewness Filtering | Judge image surfaces (darker/glossier = more positively skewed than lighter/matte surfaces) | $\tilde{f}(x, y) = \dfrac{\frac{1}{mn-1} \sum_{(r,c) \in W} \left( \frac{1}{mn-1} \sum_{(r,c) \in W} \left( g(r,c) - \frac{1}{mn-1} \sum_{(r,c) \in W} g(r,c) \right) \right)^3}{\left( \frac{1}{mn-1} \sum_{(r,c) \in W} \left( \frac{1}{mn-1} \sum_{(r,c) \in W} (g(r,c)) - \frac{1}{mn-1} \sum_{(r,c) \in W} g(r,c) \right)^2 \right)^{\frac{3}{2}}}$ |
| Kurtosis Filter | Remove image noise | $\tilde{f}(x, y) = \dfrac{\frac{1}{mn-1} \sum_{(r,c) \in W} \left( \frac{1}{mn-1} \sum_{(r,c) \in W} \left( g(r,c) - \frac{1}{mn-1} \sum_{(r,c) \in W} g(r,c) \right) \right)^4}{\left( \frac{1}{mn-1} \sum_{(r,c) \in W} \left( \frac{1}{mn-1} \sum_{(r,c) \in W} (g(r,c)) - \frac{1}{mn-1} \sum_{(r,c) \in W} g(r,c) \right)^2 \right)^2}$ |

In some embodiments, the analytics engine 107 may output one or more recommendations for image enhancement that may comprise an affine transformation matrix. An affine transformation may be described as a geometric function between affine spaces which preserves points, straight lines and planes. Examples of affine transformations include scaling, rotate, translate, reflection and shearing. In Table 3 below, examples of enhancements using 3×3 affine transformation matrices. To apply the affine matrix to an image, the image is converted to a matrix in which each entry corresponds to the pixel intensity at that location. Then each pixel's location can be represented as a vector indicating the coordinates of that pixel in the image, [x, y], where x and y are the row and column of a pixel in the image matrix. This allows the coordinate to be multiplied by an affine-transformation matrix, which gives the position that the pixel value will be copied to in the output image.

TABLE 3

Affine Transformations

| Reflection | $\begin{bmatrix} -1 & 0 & 0 \\ 0 & 1 & 0 \\ 0 & 0 & 1 \end{bmatrix}$ |
|---|---|
| Scale | $\begin{bmatrix} c_x = 2 & 0 & 0 \\ 0 & c_y = 1 & 0 \\ 0 & 0 & 1 \end{bmatrix}$ |
| Rotate | $\begin{bmatrix} \cos(\theta) & \sin(\theta) & 0 \\ -\sin(\theta) & \cos(\theta) & 0 \\ 0 & 0 & 1 \end{bmatrix}$ |
| Shear | $\begin{bmatrix} 1 & c_x = 0.5 & 0 \\ c_y = 0 & 1 & 0 \\ 0 & 0 & 1 \end{bmatrix}$ |

Embodiments of the image processing application 103 may comprise a reporting engine 113. Embodiments of the reporting engine 113 may perform the function or task of creating a report describing the types of image enhancement techniques and algorithms recommended by the analytics engine 107. The generated report may include a description of one or more proposed image enhancements, a matrix or algorithm associated with the image enhancement, a predicted rate of success, a predicted rate of improvement and/or a preview of the image after the proposed enhancement is applied to the image. The reporting engine 113 may transmit the report to the client device 110, wherein the generated report comprising the proposed enhancement techniques and algorithms may be displayed by the image processing user interface 112. Users receiving the report from the reporting engine 113 may select one or more image enhancements by interaction with the image processing user interface 112. In some embodiments, a user may manually select image enhancements, overriding the proposed image enhancements presented by the reporting engine 113. In some embodiments, a user may customize the proposed image enhancements. For example, by editing one or more values of the image enhancement's matrix to a desired value by the user. The user's image enhancement selections, customizations and modifications to the proposed image enhancements may be transmitted from the image processing user interface 112 back to the image processing application 103.

Embodiments of the image processing application 103 may comprise an enhancement engine 111. The enhancement engine 111 may perform functions or tasks associated with processing the images and image sets into enhanced images and/or enhanced image sets, in accordance with the image enhancement matrices, algorithms and techniques selected by the user. The enhancement engine 111 performs one or more mathematical calculations that may need to be performed by the image enhancements being applied and modify the pixel values of the digital images in accordance with the selected image enhancements in order to output the enhanced images and/or image sets. Once the images and image sets have been processed into enhanced images and enhanced image sets, the image processing application 103 via the reporting engine 113 may deliver the enhanced images outputted from the enhancement engine 111 to the image processing user interface 112, for the user to view. Moreover, in some embodiments, the enhancement engine 111 may report to the knowledge base 109 which image enhancements have been selected by the user and applied by the image enhancement engine 111. Records of the knowledge base 109 can be updated accordingly for each image being enhanced by the enhancement engine 111.

Embodiments of the image processing application may comprise a feedback engine 115. Embodiments of the feedback engine 115 may perform the task or function of receiving and/or translating feedback received from a user via inputs into the image processing user interface 112 and updating the records of the knowledge base for future reference. Embodiments of the feedback engine may receive one of a set of pre-programmed inputs that may be selectable on the image processing user interface 112. For example, a user inputs responses or feedback into a satisfaction survey indicating the user's satisfaction with the results of the enhanced images and enhanced image sets received. In alternative embodiments, the feedback engine may receive natural language inputs from the user describing the user's experience and feedback in response to receiving the enhanced images and enhanced image sets. Embodiments of the feedback engine 115 may include a natural language processor (NLP) that may be able to parse and breakdown the natural language provided by the user as feedback. Using the processed natural language, the image processing system 101 can understand the user feedback and the feedback engine 115 updates the knowledge base 109. Subsequently, the updated knowledge base 109 may be influenced during future instances of analyzing and recommending image enhancements for application, based on the success or failure of previous recommendation of similar images and image sets, using the user feedback provided by the feedback engine 115 as one of the metric's for determining success or failure of the applied image enhancements.

Method for Selecting and Applying Image Enhancements

Figure 4A:
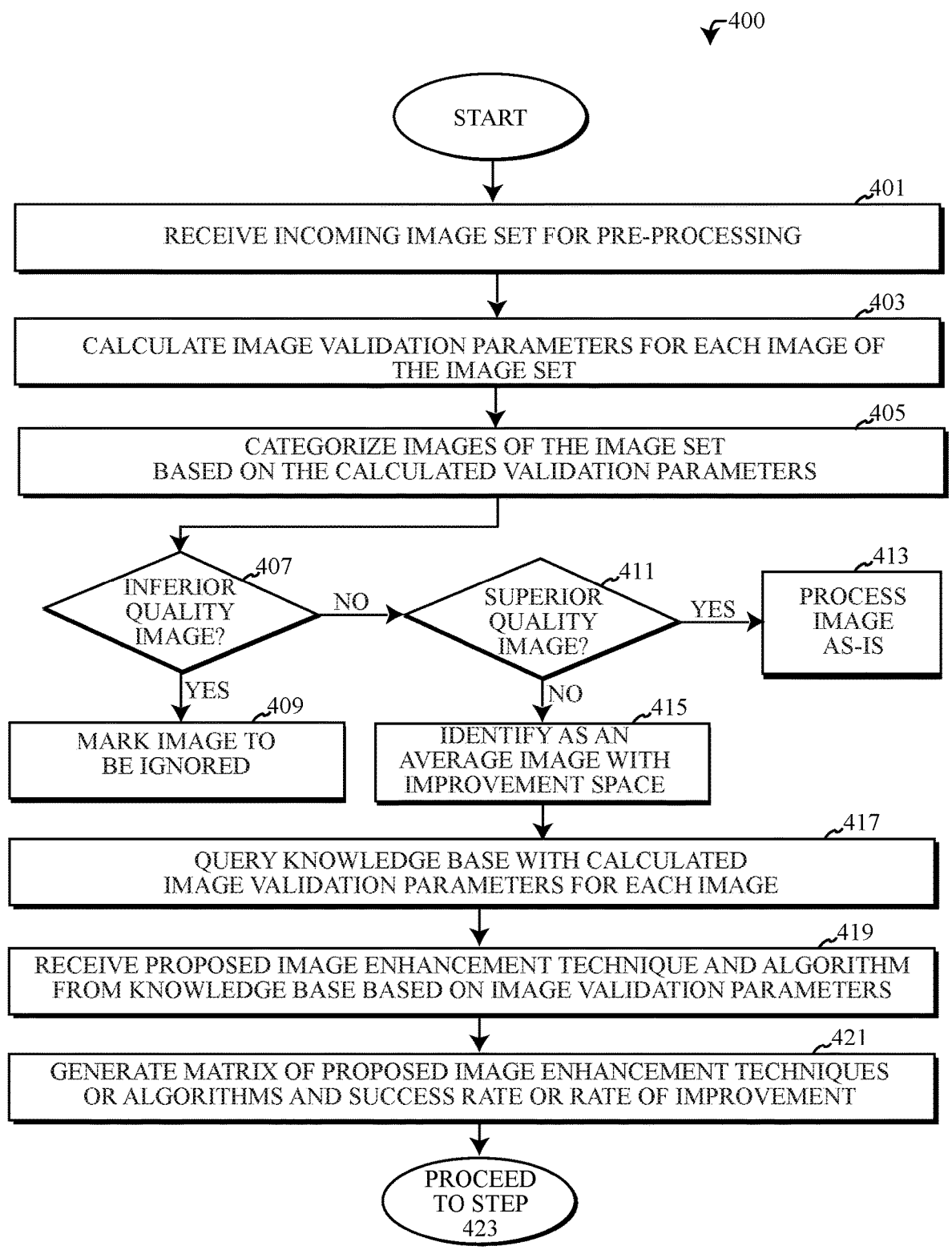
FIG. 4a depicts a flow diagram describing the operational steps of an algorithm implementing an embodiment of a computerized method for selecting and applying image enhancements in accordance with the present disclosure.
Figure 4B:
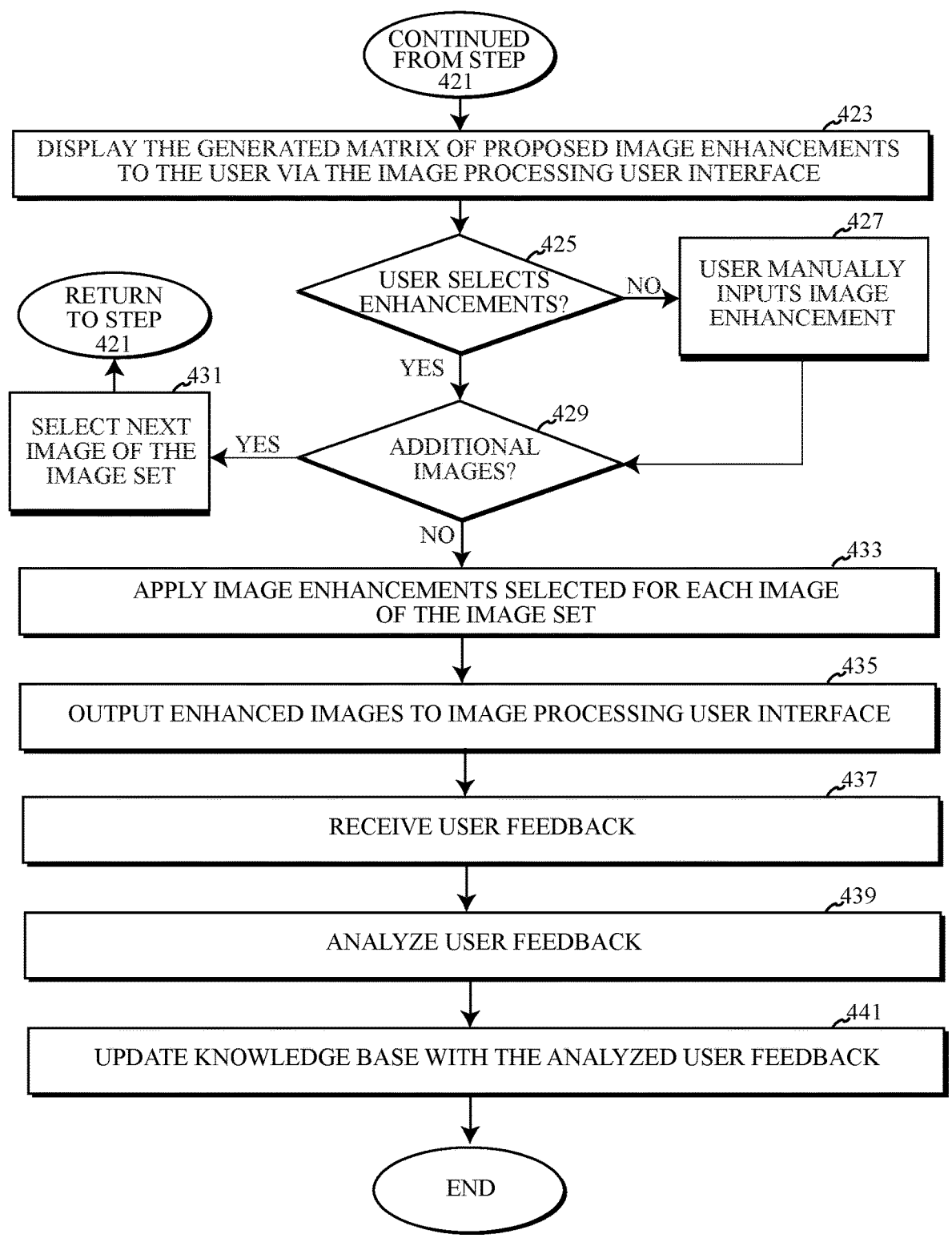

The drawings of FIGS. 4a-4b represent embodiments of an algorithm 400 for recommending, selecting and applying one or more image enhancements to an image or image set, as described in FIGS. 1-3 using one or more computer systems as defined generically by computer system 500 of FIG. 5 below and more specifically by the embodiments of specialized computer systems operating in the computer environment 100, 200 depicted in FIGS. 1-3 and as described herein. A person skilled in the art should recognize that the steps of the method described in FIGS. 4a-4b may be performed in a different order than presented and the methods of FIGS. 4a-4b may not require all the steps described herein to be performed. Rather, some embodiments may alter the methods by using one or more of the steps discussed below.

FIG. 4a represents a flowchart illustrating a first portion of an algorithm 400 for recommending, selecting and applying image enhancements to an image or image set, in accordance with the embodiments of the present disclosure. The embodiment of the method 400 may begin at step 401. In step 401, image processing application 103 receives an incoming image or image set for pre-processing. The image or image set may be received from a client device 110 or another computer system 500 accessing the image processing application 103 via an image processing user interface 112. The transmission of the image or image may be sent over network 150 and may be accompanied by a request to recommend one or more enhancements to the image or image set which may improve the overall quality of the image(s).

In step 403 of algorithm 400, the image validation engine 105 may perform pre-processing of the images of the image set received in step 401. Pre-processing of the images, may analyzing and/or calculating one or more of the images' validation parameters using the image received in step 401. Examples of image validation parameters that may be calculated by the image validation engine 105 may include the calculation of attributes such as pixel density, the dimensions of the image (e.g. length and width in pixels), pixel distribution, pixel size, pixel shape, bit depth, presence of image layers, distribution of the image's content, a histogram of the image, field of view, sharpness, noise level, signal-to-noise ratio, or any other attribute that may be identifiable or calculated from the analyzing the image.

Using the validation parameters calculated in step 403, the image validation engine 105 may, in step 405, may categorize each of the images of the image set. Based on the values of the validation parameters calculated in step 403, the image validation engine 105 may sort each of the images of the image set into categories that may denote that quality of the image provided to the image processing application 103 in step 401. For example, in the exemplary embodiment of the algorithm 400, the image validation engine 105 may sort the images into the categories of inferior, average and superior quality. In step 407 of algorithm 400, a determination may be made by the analytics engine whether or not the image being pre-processed is designated by the image validation engine 105 as inferior quality. If the image is categorized as inferior quality based on the validation parameters calculated in step 403, the algorithm may proceed to step 409, wherein the image designated as inferior quality may be marked to be ignored by the image processing system 101 during further processing of the image set.

Conversely, if the image being pre-processed is not determined to have been categorized as inferior quality in step 407, the algorithm 400 may proceed to step 411. In step 411, a second determination is made by the analytics engine 107, whether or not the image pre-processed by the image validation engine 105 has been categorized as a superior quality image in step 405. If the image being pre-processed has been categorized as a superior quality image, the algorithm may proceed to step 413 and mark the image being pre-processed as a good image sample and proceed to process the superior quality image as-is, without any further enhancements needing to be performed on this particular image of the image set. Likewise, if in step 411, the determination is made that the image is not a superior quality image, the algorithm can proceed to step 415 and proceed with identifying one or more enhancement recommendations to the image categorized as an average image quality with an improvement space for improving the image's overall quality.

In step 417, each image of the image set, which have been categorized as having an average quality, may be analyzed by the analytics engine 107 to identify one or more image enhancements that may be suitable for application to the images, based on the validation parameters calculated in step 403 and historically applied enhancements recorded in the records of the knowledge base 109. Embodiments of the analytics engine 107 may query the knowledge base 109 using the calculated image validation parameters as the underlying search parameters of the query. In response to the query, embodiments of the knowledge base 109 may (in conjunction with one or more machine learning algorithms) provide one or more suggested image enhancement techniques or algorithms to the analytics engine 107 in step 419, based on successfully applied image enhancements the image processing application 103 may have performed previously (either actual image processing or processing performed during a training phase). In step 421, the analytics engine 107 may generate a matrix or formula for applying an algorithm of the proposed image enhancements received from the knowledge base in step 419. Furthermore, in addition to the matrix being generated, the analytics engine

107 may further calculate a predicted success rate and/or a predicted rate of improvement based on the records of the knowledge base 109.

In step 423 of algorithm 400, the reporting engine 113 of the image processing application 103 may generate a report comprising one or more proposed image enhancements, the matrix or formula for applying each of the proposed image enhancements, each the predicted success rates, and/or each of the expected rates of improvement to the overall quality of the image if the proposed enhancement is selected and applied to the image(s) of the image set. The reporting engine 113 may display the each of the proposed image enhancements, the generated matrix or formula, the predicted success rate and/or the predicted rate of improvement to the overall quality to the user via the image processing user interface 112. The user may interact with the report on the GUI of the image processing user interface 112 to select image enhancements the user would like to apply to each image of an image set, customize one or more of the proposed image enhancements and/or override one or more proposed image enhancements with an image enhancement manually selected by the user.

In step 425 of algorithm 400, a determination is made whether or not the user has selected one or more of the image enhancements displayed by image processing user interface 112 in step 425 for each image of the image set. If the determination is made that the user has not selected one of the proposed image enhancement, the algorithm may proceed to step 427, wherein the user manually inputs an image enhancement (for example, by manually inputting or customizing a matrix describing the image enhancement). Once the user has either selected enhancements in step 425 or has manually inputted image enhancements in step 427, the algorithm may perform a check in step 429 to determine whether or not there are any additional images in the image set where user input may be needed to continue with the selection and processing of the image enhancements. Embodiments of the image processing application 103 may update the records of the knowledge base 109 to accurately reflect the image enhancement selections made by the user for each corresponding image of the image set.

If there are additional images in the image set, the algorithm may proceed to step 431 where the next image of the image set is selected by the analytics engine 107 and the algorithm may proceed back to step 421 to prepare the proposed recommendations, matrix, success rate and improvement rate calculations for the next image of the image set being reported to the user for user selection. Steps 421, 423, 427, 429 and/or 431 may be repeated as needed until each image in the image set scheduled to be processed by the image processing system 101 has been presented to the user for image enhancement selection.

In step 433 of the algorithm 400, the enhancement engine 111 applies the image enhancements selected by the user in steps 425 and/or 427 to the images of the image set, creating an enhanced image set comprising one or more enhanced images and/or images of superior image quality (as identified in step 411). In step 435, the enhanced image set comprising one or more enhanced images is outputted by the enhancement engine 111 and transmitted to the image processing user interface 112. A user receiving the enhanced image set may, in step 437 provide user feedback critiquing the outputted enhanced images of the image set by selecting a pre-programmed input in response (i.e. such as a rating or pre-selected response) to the user's viewing of the enhanced images, providing comments or critique in a natural language that can be parsed and interpreted by the feedback engine 115 into a machine-readable format. In some embodiments, the user feedback may be in the form of sensor readings that measure physiological responses of the user while the user is viewing the enhanced images. In some embodiments, the feedback received may be recorded by a camera or other image capturing device. The image capturing device may record facial expressions, comments, and other indicators that can be interpreted by the feedback engine 115 as either the user's satisfaction or dissatisfaction with the enhanced image set.

In step 439 of the algorithm 400, the feedback engine 115 analyzes the user feedback received in step 437. The feedback engine 115 may interpret the level of satisfaction or dissatisfaction of the user with the enhanced image set and/or enhancements to individual images of the image set and classify or quantify the level of satisfaction or dissatisfaction. Embodiments of the feedback engine 115 may, in step 441 update the knowledge base 109 with the user feedback. The user feedback may be stored to the records of the knowledge base 109 either as raw feedback data and/or feedback data that has been interpreted by the feedback engine 115. The updated knowledge base 109 records may further influence subsequent image pre-processing and processing decisions, allowing for the image processing system 101 to learn and understand which types of enhancements to images having a particular category of validation parameters are most likely to be successful in improving image quality and achieve user feedback that indicates satisfaction with the image enhancements applied, allowing for the image processing application 103 to duplicate the recommendations for similar types of images having similar types of validation parameters during future image processing tasks.

Computer System

FIG. 5 depicts a block diagram of internal and external components of embodiment of a computer system 500, which may be representative of the one or more computer systems depicted in the computing environment 100, 200 as shown in FIGS. 1-3 in accordance with the embodiments of the present disclosure. It should be appreciated that FIG. 5 provides only an illustration of one implementation and does not imply any limitations with regard to the environments in which different embodiments may be implemented. In general, the components illustrated in FIG. 5 are representative of any electronic device capable of executing machine-readable program instructions. Examples of computer systems, environments, and/or configurations that may be represented by the components illustrated in FIG. 5 include, but are not limited to, personal computer systems, server computer systems, thin clients, thick clients, laptop computer systems, tablet computer systems, cellular telephones (e.g., smart phones), multiprocessor systems, microprocessor-based systems, network PCs, minicomputer systems, mainframe computer systems, and distributed cloud computing environments that include any of the above systems or devices.

Computer system 500 may include communications fabric 502, which provides for communications between one or more processors 503, memory 505, persistent storage 506, communications unit 511, and one or more input/output (I/O) interfaces 515. Communications fabric 502 can be implemented with any architecture designed for passing data and/or controlling information between processors 503 (such as microprocessors, communications and network processors, etc.), memory 505, external devices 517, and any other hardware components within a system. For example, communications fabric 502 can be implemented with one or more buses.

Memory 505 and persistent storage 506 may be computer-readable storage media. Embodiments of memory 505 may include random access memory (RAM) and cache 507 memory. In general, memory 505 can include any suitable volatile or non-volatile computer-readable storage media. Software, such as a vocational application 103 may be stored in persistent storage 506 for execution and/or access by one or more of the respective processors 503 via one or more devices of memory 505.

Persistent storage 506 may include, for example, a plurality of magnetic hard disk drives. Alternatively, or in addition to magnetic hard disk drives, persistent storage 506 can include one or more solid state hard drives, semiconductor storage devices, read-only memories (ROM), erasable programmable read-only memories (EPROM), flash memories, or any other computer-readable storage media that is capable of storing program instructions or digital information. Embodiments of the media used by persistent storage 506 can also be removable. For example, a removable hard drive can be used for persistent storage 506. Other examples include optical and magnetic disks, thumb drives, and smart cards that are inserted into a drive for transfer onto another computer-readable storage medium that is also part of persistent storage 506.

Communications unit 511 provides for communications with other computer systems or devices via a network (e.g., network 150). In the exemplary embodiment, communications unit 511 may include network adapters or interfaces such as a TCP/IP adapter cards, wireless Wi-Fi interface cards, 3G, 4G, or 5G wireless interface cards or other wired or wireless communication links. The network 150 can comprise, for example, copper wires, optical fibers, wireless transmission, routers, firewalls, switches, gateway computers and/or edge servers. Software and data used to practice embodiments of the present invention can be downloaded to each of the computer systems operating in computing environment 100, 200 or computer system 500 through communications unit 511 (e.g., via the Internet, a local area network or other wide area network). From communications unit 511, the software and data can be loaded onto persistent storage 506.

One or more I/O interfaces 515 may allow for input and output of data with other devices that may be connected to computer system 500. For example, I/O interface 515 can provide a connection to one or more external devices 517 such as one or more internet-of-things devices, recording device 114 such as an audio system, video systems, one or more sensor device(s) 116, input devices such as a keyboard, computer mouse, touch screen, virtual keyboard, touch pad, pointing device, or other human interface devices. External devices 517 can also include portable computer-readable storage media such as, for example, thumb drives, portable optical or magnetic disks, and memory cards. I/O interface 515 may connect to human-readable display 518.

Human-readable display 518 provides a mechanism to display data to a user and can be, for example, a computer monitor or screen. Human-readable display 518 can integrated into computer systems 500 such as a desktop computer, laptop computer, tablet computer, smartphone, smartwatch, etc. A human-readable display 518 may include a touchscreen which is an input device layered on top of the display for allowing a user to control an electronic device via simple or multi-touch gestures by touching the display with a special stylus and/or one or more fingers. The human-readable display 518 in modern monitors is typically a thin film transistor liquid crystal display (TFT-LCD) or a flat panel LED (light emitting diode) display, while older monitors used cathode ray tubes (CRT). It may be connected to the computer via VGA (video graphics array), DVI (digital video interface), HDMI (High Definition Multi-Media Interface), DisplayPort, Thunderbolt, LVDS (Low-Voltage Differential Signaling) or other proprietary connectors and signals. Originally, computer monitors were used for data processing. From the 1980s onwards, computers (and their monitors) have been used for both data processing and entertainment. The common aspect ratio of computer monitors has changed from "four to three" to "sixteen to nine" resulting in more of a wide-screen display.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising the steps of:
    receiving an image set comprising at least one image;
    calculating validation parameters for each image of the image set;
    categorizing each image of the image set based on the validation parameters, wherein the step of categorizing identifies a category of images in the image set that have an available improvement space for enhancement;
    querying a knowledge base for recommended image enhancements based on the validation parameters for each image having the available improvement space;
    generating a matrix comprising a set of one or more recommended image enhancements and a set of success rates for each enhancement recommended;
    displaying on a user interface, the one or more recommended image enhancements, a predicted rate of success for applying the one or more recommended image enhancements, a predicted rate of improvement to the improvement space of each image, and a preview of each image of the image set after applying the one or more recommended image enhancements;
    customizing the one or more recommended image enhancements displayed by the user interface by editing one or more values of the matrix to a desired value selected by the user;
    applying the one or more recommended image enhancements selected by a user from the user interface, to at least one image of the image set having the available improvement space, including application of at least one customized image enhancement comprising the one or more values of the matrix edited by the user, creating at least one enhanced image;
    outputting an enhanced image set, wherein the enhanced image set replaces at least one image of the image set with the at least one enhanced image;
    receiving user feedback critiquing the enhanced image set; and
    storing user feedback to the knowledge base, improving future recommended image enhancements for images comprising similar validation parameters.

2. The method of claim 1, wherein the step of categorizing each image of the image set includes sorting each image of the image set into a category selected from the group consisting of an inferior quality image, a superior quality image and an average image with the available improvement space.

3. The method of claim 2, further comprising the steps of:
marking to ignore each image of the image set categorized as the inferior quality image during the outputting of the enhanced image set; and
including each superior quality image, un-enhanced, within the enhanced image set.

4. The method of claim 1, wherein the validation parameters for each image of the image set are selected from the group consisting of dots per inch (DPI), length and width of the image, a histogram of the image, pixel distribution, image rotation, image layers, content distribution, and a combination thereof.

5. The method of claim 1, further comprising the steps of:
selecting, by the user, a first image enhancement from the matrix to apply to a first image of the image set; and
selecting, by the user, a second image enhancement from a second matrix comprising a second set of one or more recommended image enhancements to apply to a second image of the image set, and a second set of success rates for each enhancement proposed for the second image, wherein the first image enhancement is different from the second image enhancement.

6. The method of claim 1, wherein the one or more image enhancements selected by the user are selected from the matrix comprising the set of one or more recommended image enhancements.

7. The method of claim 1, wherein the one or more image enhancements selected by the user are manually selected by the user, and the image enhancements selected by the user are not part of the set of one or more recommended image enhancements described by the matrix.

8. A computer system comprising:
a processor; and
a computer-readable storage media coupled to the processor, wherein the computer-readable storage media contains program instructions executing a computer-implemented method comprising the steps of:
receiving an image set comprising at least one image,
calculating validation parameters for each image of the image set,
categorizing each image of the image set based on the validation parameters, wherein the step of categorizing identifies a category of images in the image set that have an available improvement space,
querying a knowledge base for recommended image enhancements based on the validation parameters for each image having the available improvement space,
generating a matrix comprising a set of one or more recommended image enhancements and a set of success rates for each enhancement recommended,
displaying on a user interface, the one or more recommended image enhancements, a predicted rate of success for applying the one or more recommended image enhancements, a predicted rate of improvement to the improvement space of each image, and a preview of each image of the image set after applying the one or more recommended image enhancements,
customizing the one or more recommended image enhancements displayed by the user interface by editing one or more values of the matrix to a desired value selected by the user,
applying the one or more recommended image enhancements selected by a user from the user interface, to at least one image of the image set having the available improvement space, including application of at least one customized image enhancement comprising the one or more values of the matrix edited by the user, creating at least one enhanced image,
outputting an enhanced image set, wherein the enhanced image set replaces at least one image of the image set with the at least one enhanced image,
receiving user feedback critiquing the enhanced image set, and
storing user feedback to the knowledge base, improving future recommended image enhancements for images comprising similar validation parameters.

9. The computer system of claim 8, wherein the step of categorizing each image of the image set includes sorting each image of the image set into a category selected from the group consisting of an inferior quality image, a superior quality image and an average image with the available improvement space.

10. The computer system of claim 9, further comprising the steps of:
marking to ignore each image of the image set categorized as the inferior quality image during the outputting of the enhanced image set; and
including each superior quality image, un-enhanced, within the enhanced image set.

11. The computer system of claim 8, wherein the validation parameters for each image of the image set are selected from the group consisting of dots per inch (DPI), length and width of the image, a histogram of the image, pixel distribution, image rotation, image layers, content distribution, and a combination thereof.

12. The computer system of claim 8, further comprising the steps of:
selecting, by the user, a first image enhancement from the matrix to apply to a first image of the image set; and
selecting, by the user, a second image enhancement from a second matrix comprising a second set of one or more recommended image enhancements to apply to a second image of the image set, and a second set of success rates for each enhancement proposed for the second image, wherein the first image enhancement is different from the second image enhancement.

13. The computer system of claim 8, wherein the one or more image enhancements selected by the user are manually selected by the user, and the image enhancements selected by the user are not part of the set of one or more recommended image enhancements described by the matrix.

14. The computer system of claim 8 further comprising an image capturing device, wherein said image capturing device creates the image set received by the computer system.

15. A computer program product comprising:
one or more computer readable storage media having computer-readable program instructions stored on the one or more computer-readable storage media, said program instructions executes a computer-implemented method comprising the steps of:
receiving an image set comprising at least one image,
calculating validation parameters for each image of the image set,
categorizing each image of the image set based on the validation parameters, wherein the step of categorizing identifies a category of images in the image set that have an available improvement space,
querying a knowledge base for recommended image enhancements based on the validation parameters for each image having the available improvement space, generating a matrix comprising a set of one or more recommended image enhancements and a set of success rates for each enhancement recommended, displaying on a user interface, the one or more recommended image enhancements, a predicted rate of success for applying the one or more recommended image enhancements, a predicted rate of improvement to the improvement space of each image, and a preview of each image of the image set after applying the one or more recommended image enhancements, customizing the one or more recommended image enhancements displayed by the user interface by editing one or more values of the matrix to a desired value selected by the user;

applying the one or more recommended image enhancements selected by the user from the user interface, to at least one image of the image set having the available improvement space, including application of at least one customized image enhancement comprising the one or more values of the matrix edited by the user, creating at least one enhanced image, outputting an enhanced image set, wherein the enhanced image set replaces at least one image of the image set with the at least one enhanced image, receiving user feedback critiquing the enhanced image set, and storing user feedback to the knowledge base, improving future recommended image enhancements for images comprising similar validation parameters.

16. The computer program product of claim 15, wherein the step of categorizing each image of the image set includes sorting each image of the image set into a category selected from the group consisting of an inferior quality image, a superior quality image and an average image with the available improvement space.

17. The computer program product of claim 16, further comprising the steps of:
marking to ignore each image of the image set categorized as the inferior quality image during the outputting of the enhanced image set; and
including each superior quality image, un-enhanced, within the enhanced image set.

18. The computer program product of claim 15, wherein the validation parameters for each image of the image set are selected from the group consisting of dots per inch (DPI), length and width of the image, a histogram of the image, pixel distribution, image rotation, image layers, content distribution, and a combination thereof.

19. The computer program product of claim 15 further comprising the steps of:
selecting, by the user, a first image enhancement from the matrix to apply to a first image of the image set; and
selecting, by the user, a second image enhancement from a second matrix comprising a second set of one or more recommended image enhancements to apply to a second image of the image set, and a second set of success rates for each enhancement proposed for the second image, wherein the first image enhancement is different from the second image enhancement.

20. The computer program product of claim 15, wherein the one or more image enhancements selected by the user are manually selected by the user, and the image enhancements selected by the user are not part of the set of one or more recommended image enhancements described by the matrix.

* * * * *